United States Patent [19]

Mauthe et al.

[11] Patent Number: 4,764,836

[45] Date of Patent: Aug. 16, 1988

[54] CIRCUIT BREAKER

[75] Inventors: Gerhard Mauthe, Birmenstorf; Lutz Niemeyer, Birr; Friedrich Pinnekamp, Siggenthal-Station; Norbert Wiegart, Baden, all of Switzerland

[73] Assignee: BBC Brown, Boveri & Company, Ltd., Baden, Switzerland

[21] Appl. No.: 844

[22] Filed: Jan. 6, 1987

[30] Foreign Application Priority Data

Jan. 31, 1986 [CH] Switzerland ........................ 369/86

[51] Int. Cl.[4] ........................................ H02H 3/00

[52] U.S. Cl. ........................................ 361/5; 361/8; 361/11; 361/13; 335/11

[58] Field of Search ........................ 361/5, 6, 7, 13, 8, 361/11; 335/6, 7, 11, 12; 307/134, 135, 137

[56] References Cited

U.S. PATENT DOCUMENTS

| | | | |
|---|---|---|---|
| 3,388,295 | 6/1968 | Misencik et al. | 361/11 |
| 4,209,814 | 6/1980 | Garzon | 361/5 |
| 4,459,629 | 7/1984 | Titus | 361/3 |
| 4,636,907 | 1/1987 | Howell | 361/13 |

FOREIGN PATENT DOCUMENTS

| | | |
|---|---|---|
| 2333338 | 6/1977 | France . |
| 1147576 | 4/1969 | United Kingdom . |

*Primary Examiner*—G. P. Tolin
*Assistant Examiner*—Derek S. Jennings
*Attorney, Agent, or Firm*—Burns, Doane, Swecker & Mathis

[57] ABSTRACT

The circuit breaker displays a commutation device (4) and a semiconductor valve arrangement (6) which is connected in parallel with the commutation device (4), an isolating switching point (5) connected in series with the semiconductor valve arrangement (6) and a control circuit (11). The control circuit detects the polarity of the current to be disconnected and, together with a switching-off command (24), emits a response command to the commutation device (4) when the detected current flows in the direction of conduction of the semiconductor valve arrangement (6). When the current to be disconnected is interrupted in the semiconductor valve arrangement (6) after the commutation device (4) has responded, the control circuit (11) emits a release command to the isolating switching point (5) forming an isolating gap. As a result, the semiconductor valve arrangement (6) is isolated and the switching-off process is terminated. This circuit breaker is intended to be controlled by simple means, in spite of a comparatively low number of semiconductor valves (diode 10). This is achieved by the fact that the semiconductor valve arrangement (6) contains at the most one semiconductor valve (diode 10) or a series circuit of several semiconductor valves (diodes 10, 18) with the same direction of conduction, and that the commutation device (4) and the isolating switching point (5) are mechanically coupled to each other in such a manner that the isolating switching point (5) opens with a predetermined time delay after the commutation device (4) has responded.

6 Claims, 3 Drawing Sheets

CIRCUIT BREAKER

Figure 1:
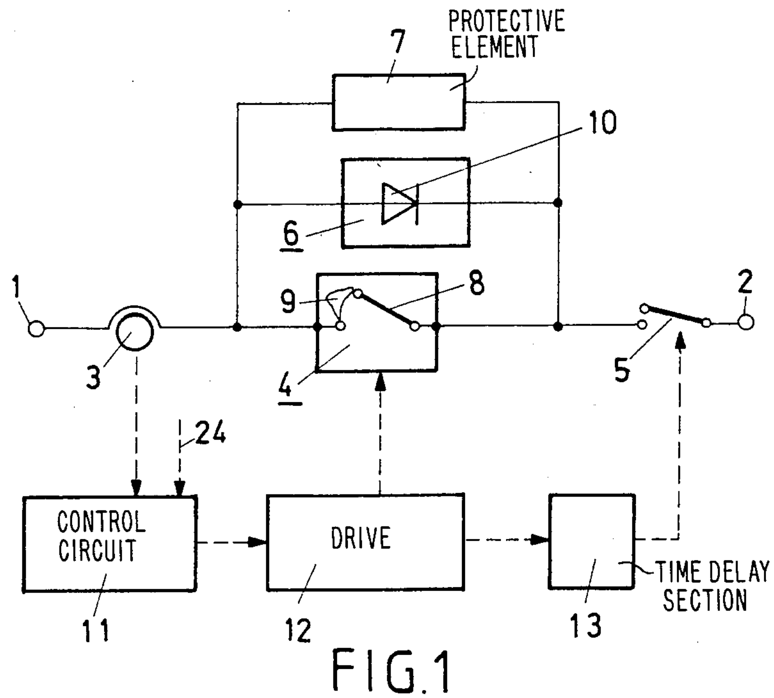

The invention is based on a circuit breaker according to the first part of claim 1.

The invention refers to a prior art of circuit breakers as described, for example, in U.S. Ser. No. A-4,209,814 and U.S. Ser. No. A-4,459,629. In the known circuit breakers, semiconductor valves are used as fast switching elements. In this arrangement, at least two semiconductor valves of the opposite direction of conduction, connected in parallel with each other or in series, operate in conjunction with mechanically operating devices which are provided for commutating the current to be disconnected and for isolating the semiconductor valves.

The invention specified in the claims achieves the object of specifying a circuit breaker of the generic type in which, in spite of a comparatively small number of semiconductor valves, a simple control of the device effecting the commutation of the current to be disconnected and effecting the isolation of the semiconductor valves is possible.

The circuit breaker according to the invention is distinguished by the fact that a single semiconductor valve is sufficient for fulfilling the switching functions described above in combination with the device effecting the commutation of the current to be disconnected and effecting the isolation of this semiconductor valve. In addition, it is controllable in a very simple manner because of the mechanical coupling of the commutation device and isolation device.

Figure 2:
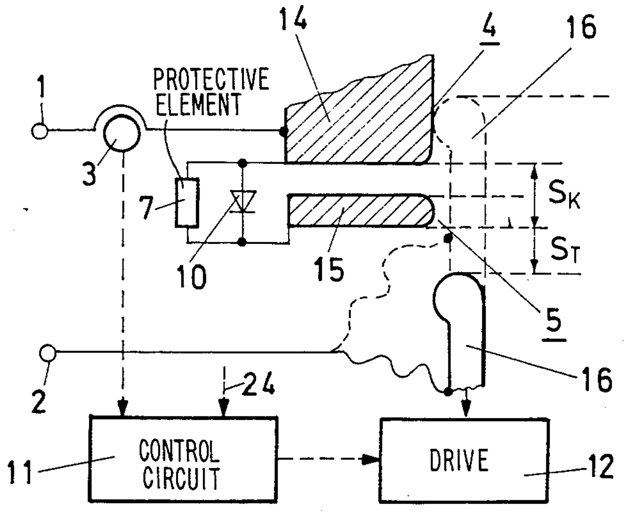
Figure 3:
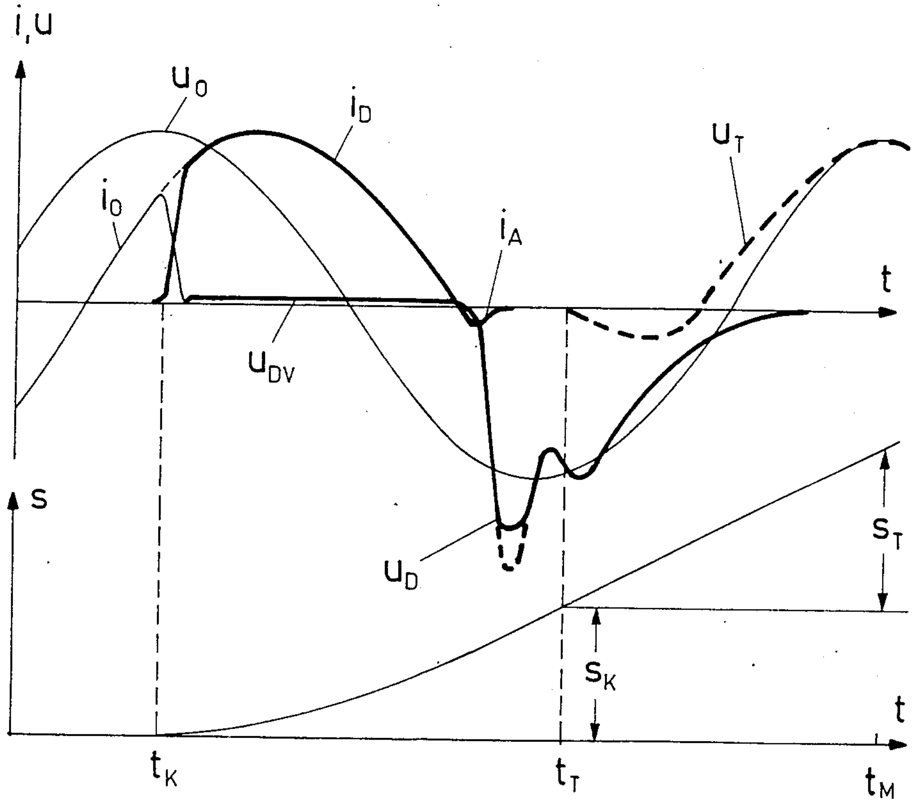
Figure 4:
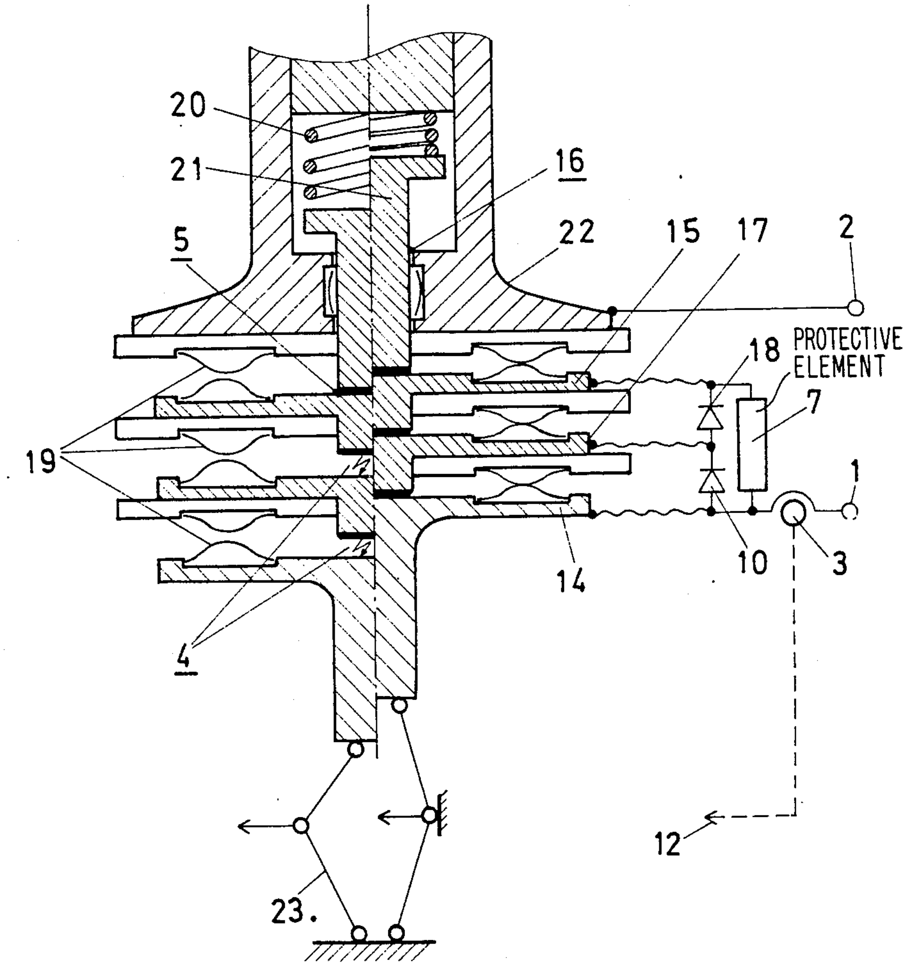

In the text which follows, the invention is explained in greater detail with the aid of the drawing, in which:

FIG. 1 shows a basic circuit diagram of the circuit breaker according to the invention, comprising a commutation device 4 and an isolating switching point 5, FIG. 2 shows a view of the constructional configuration of the commutation device 4 and of the isolating switching point 5 of a first embodiment of the circuit breaker according to the invention, FIG. 3 shows a diagram in which the operation of the circuit breaker according to FIG. 2 is shown, and FIG. 4 shows a view of the constructional configuration of the commutation device 4 and of the isolating switching point 5 of a second embodiment of the circuit breaker according to the invention.

Identical parts are provided with identical reference symbols in all figures. In the basic circuit diagram, shown in FIG. 1, of the circuit breaker according to the invention, a device 3 for measuring the current flowing between power terminals 1 and 2, a commutation device 4 and an isolating switching point 5 are located connected in series between two power terminals 1, 2. A semiconductor valve arrangement 6 and a protective element 7 are in each case connected in parallel with the commutation device 4.

The current measuring device 3 contains a sensor detecting the polarity of the current to be disconnected.

In contrast, the commutation device contains at least one commutation switching point 8 actuated by mechanically driven switching members. In this arrangement, a commutation of the current to be disconnected into the semiconductor valve arrangement 6 is achieved with the aid of a switching arc 9 produced during a switching process. The commutation device 4 can additionally also display a resistance (the value of which changes in the course of the actuation of the switching members of the commutation switching point 8), an inductance, such as, for example, a transductor, or a capacitor in each case parallel with or in series with at least one commutation switching point 8. A mechanically driven fast-acting switch can be used as isolating switching point 5.

The semiconductor valve arrangement 6 can comprise, for example, a single semiconductor valve such as a diode 10 or a series circuit of several semiconductor valves having the same direction of conduction. In this arrangement, naturally, a semiconductor valve can easily be constructed of several diodes having the same direction of conduction, the p-n junctions of which are connected in parallel with each other. To achieve an advantageous aftercurrent during disconnection, the diode 10 is suitably constructed as a disk of specially doped material and predetermined thickness. To enable simple pressure contacting to be achieved, it is recommended to provide the disc with a central hole.

The protective element 7 can be formed by a circuit arrangement which preferably contains an RC section and/or a metal-oxide based overvoltage arrester.

The output signal emitted by the current measuring device 3 is detected by a control circuit 11, which may contain programmable components, the output of which acts via a drive 12 on the commutation device 4 and via a time delay section 13 on the isolating switching point 5.

In the switched-on position of the circuit breaker, the current to be disconnected predominantly flows through the commutation device 4 which bridges the semiconductor valve arrangement 6. When the current is to be disconnected, and has a polarity which corresponds to the direction of conduction of the semiconductor valve arrangement 6, the control circuit 11 emits a signal to the drive 12 which effects a response of the commutation device 4 and thus, by forming the switching arc 9, an increase in the resistance in the current path containing the commutation device 4. As soon as the voltage drop of the current to be disconnected significantly exceeds the conduction voltage of the semiconductor valve arrangement 6 in the commutation device 4, the current to be disconnected predominantly commutates into the current path containing the semiconductor valve arrangement 6 and is then disconnected after the zero transition of the current in the semiconductor valve arrangement 6 which is now no longer operated in blocking direction because of the polarity change. During this process, the isolating switching point 5 is mechanically controlled via the drive 12 and the time delay section 13 in such a manner that it opens shortly after the zero transition of the current at a time at which a depletion current flowing through the semiconductor valve arrangement 6 has decayed.

FIG. 2 shows the constructional configuration of the commutation device 4 and of the isolating switching point of a first embodiment of the circuit breaker according to the invention, shown in principle in FIG. 1. It can be seen from this figure that the commutation device 4 and the isolating switching point 5 consists of three switching members 14, 15, 16, of which the switching member 14 is connected to the power terminal 1 and the anode of the diode 10 forming the semiconductor valve arrangement 6, the switching member 15 is connected to the cathode of the diode 10 and, finally, the switching member 16 is connected to the power terminal 2.

The operation of this embodiment of the circuit breaker according to the invention is as follows:

In the switched-on position, shown partially dashed in FIG. 2, the switching members 14 and 16 are in contact with one another so that the current to be disconnected flows from the power terminal 1 via the switching members 14 and 16 to the power terminal 2. The diode 10 is out of circuit at this stage and is therefore protected against unwanted partial currents in the switched-on position of the switch. With the occurrence of a switching-off command 24, the control circuit 11 effects the downward movement of the switching member 16, designated by an arrow, at a time determined by the polarity of the current to be disconnected, via the drive 12. In this arrangement, the switching members are of such a construction that the moving switching member 16 is in contact with the switching member 15 as soon as the switching members 14 and 16 separate from each other. A switching arc formed temporarily between the switching members 14 and 16, not drawn in FIG. 2, causes the commutation of the current to be disconnected into the current path including the diode 10. The switching arc is extinguished a short time after the commutation due to the fact that the forward voltage of the diode 10 is less than the voltage drop across the arc. After a suitable delay time which is essentially determined by the fact that the diode 10 is cut off and the after current has largely decayed, the switching member 16 disengages from the switching member 15, which forms an isolating gap.

The variation of the currents i and of the voltages u and of the stroke s of the switching member 16, occurring as a function of time t during the disconnection process described above, is explained in greater detail below with the aid of FIG. 3 for an essentially inductive current. In this context, an impressed voltage $u_O$ present across the power terminals 1 and 2 is shifted in phase by 90° with respect to the disconnection current $i_O$ flowing via the two switching members 14 and 16. At time $t_K$, which is located in a half wave of the current to be interrupted which is positive with respect to the direction of conduction of the diode 10 - as was described above during the explanation of the basic configuration of the circuit breaker according to the invention - the switching member 16 disengages from the switching member 14 and at the same time comes into contact with the switching member 15. The current to be disconnected then commutates into the current path containing the diode 10. During this process, the part of the disconnection current $i_O$ flowing via the switching members 14 and 16 can be seen to drop to almost zero within a short period whilst the remaining part of the disconnection current $i_O$ flowing as diode current $i_D$ in the diode 10 (drawn dashed from time $t_K$) rises rapidly. At the same time, the diode forward voltage $u_{DV}$ drops as voltage $u_D$ via the diode 10 which was short-circuited before time $t_K$.

After the zero transition of the disconnection current $i_O$, which now flows exclusively as diode current $i_D$, the diode 10 blocks. Only a comparatively small depletion current $i_A$ now flows as diode current. At the same time, the voltage $u_D$ settles to the impressed voltage $u_O$, now acting as blocking voltage, across the diode. During this process, any overvoltages occurring (drawn dashed) are limited to permissible values by the protective element 7. After the depletion current $i_A$ has decayed and a blocking current which is small (and thus not shown) now flows through the diode 10, the switching member 16 disengages from the switching member 15 at time $t_T$ so that the voltage $u_D$ across the diode 10 disappears due to the depletion layer capacitances and the capacitances of the protective element 7 being discharged and thus the voltage $u_T$ in the isolation gap formed between the switching members 15 and 16 assumes the value of the impressed voltage $u_O$.

In this arrangement, the stroke s of the switching member 16 moved by the drive 12 will be dimensioned in such a manner that the stroke $s_K$ produced by switching member 16 at time $t_T$ corresponds to the distance between the switching members 14 and 15 at which the switching member 16 first disengages from switching member 14 and then from switching member 15 at times $t_K$ and $t_T$, and that the stroke $s_T$ produced at time $t_M$ of the voltage maximum of the impressed voltage $u_O$ following the current interruption from time $t_T$ is sufficiently large to maintain the maximum impressed voltage dropping across the isolating gap formed between the switching members 15 and 16. FIG. 4 shows the constructional configuration of the commutation device 4 and of the isolating switching point 5 of a second embodiment of the circuit breaker according to the invention, shown in principle in FIG. 1. It can be seen from this figure that the commutation device 4 and the isolating switching point 5 are formed by the three switching members 14, 15 and 16 and by a fourth switching member 17, of which the switching member 14 is connected to the power terminal 1 and to the anode of the diode 10 provided in the semiconductor valve arrangement 6, the switching member 15 is connected to the cathode of another diode 18 provided in the semiconductor valve arrangement 6 which is connected in the same polarity in series with the diode 10, the switching member 16 is connected to the power terminal 2 and the switching member 17, finally, is connected to the junction between the two diodes 10 and 18. The switching members 14, 15, 16 and 17 are of dish-shaped construction and arranged in the form of a stack. Between each two of the switching members, compression springs 19 are located which are electrically insulated with respect to at least one of the two adjacent switching members. The switching member 16 displays a trailing contact 21, driven by a spring 20, the trailing stroke of which is matched to the opening of the isolating switching point 5, which opening is delayed in time with respect to the commutation switching points 8. The trailing contact 21 is carried in a fixed contact part 22 of the switching member 16. On the contact part 22 are supported those compression springs 19 which are arranged between the switching members 15 and 16.

This embodiment of the circuit breaker according to the invention acts as follows: in the switched-on position shown in the right-hand half of FIG. 4, the switching members 14 and 17 and 17 and 15 and the switching member 15 and the trailing contact 21 are in contact with each other. In this arrangement, the current to be disconnected flows from the power terminal 1 via a flexible power link, the switching members 14, 17 and 15 and the trailing contact 21, a sliding contact and the fixed contact part 22 to the power terminal 2. The compression springs 19, like the spring 20, are under tension. During the switching-off process, a dead-point latching 23 of the drive 12 is released. The compression springs 19 under tension accelerate the switching members 15, 17 and 14 with respect to each other. As a result, the switching members 15 and 17 and 17 and 14 are first separated from each other and the switching gaps shown in the left-hand half of FIG. 4 form between them, in which switching arcs indicated by zig-zag arrows burn, which cause the current to be disconnected to be commutated to the current path containing the diodes 10, 18. The trailing contact 21 and the switching member 15 initially still remain in engagement with each other even after the commutation of the current to be disconnected, since the spring 20 causes the trailing contact 21 to follow the switching member 15. After a predetermined delay time, within which the current to be disconnected is interrupted in the semiconductor valve arrangement 6 formed by the diodes 10 and 18 and the remaining depletion current has decayed, the trailing contact 21 impacts on the fixed contact part 22. After the time of impact, the trailing contact 21 also separates from switching member 15, forming the desired isolating gap of the isolating switching point 5. In this arrangement, the required delay time can be adjusted by suitably dimensioning the trailing stroke of the trailing contact 21.

In further development of the illustrative embodiment described in FIG. 1, it is conceivable to form three and more commutation switching points, instead of two commutation switching points formed by the switching members 14, 17 and 17, 15, by suitably arranging further switching members and further diodes. In addition, the commutation device 4 and the isolating switching point 5 can be accommodated in all embodiments of the invention in a housing which is filled with a gaseous and/or liquid insulating means or contains a vacuum.

We claim:

1. A circuit breaker comprising:

a commutation device, said commutation device containing at least one commutation switching point, a semiconductor valve arrangement connected in parallel with said commutation device, said semiconductor valve arrangement containing at the most one of one semiconductor valve and a series circuit of several semiconductor valves with the same direction of conduction, an isolating switching point connected in series with said semiconductor valve arrangement, wherein said at least one commutation switching point and said isolating switching point are actuated by mechanically driven switching members and controlled in such a manner that said isolating switching point opens after a stroke, performed in a predetermined time delay, of the switching members of the at least one commutation switching point, wherein the at least one commutation switching point and said one isolating point are formed by at least three said switching members, a first one of said switching members being connected to a first power terminal and to a first connection of said semiconductor valve arrangement, a second of said switching members being connected to a second connection of said semiconductor valve arrangement and a third said switching members being connected to a second power terminal, and wherein said first switching member and said third switching member are in contact with each other in the switched-on position, and wherein said second switching member and said third switching member are temporarily in contact with each other after the opening of said at least one commutation switching point, with said third switching member moving from said first switching member to said second switching member, and a control circuit which detects the polarity of the current to be disconnected, detects a switching-off command for said circuit breaker, emits a response command acting on said commutation device when the detected current flows in the direction of conduction of said semiconductor valve arrangement, and emits a release command acting on said isolating switching point when the current to be disconnected is interrupted in said semiconductor valve arrangement after said commutation device has responded to said response command through the opening of said at least one commutation switching point, wherein said commutation device and said isolating switching point are controlled by mechanical coupling in such a manner that said isolating switching point opens at a time at which a depletion current, flowing through the semiconductor valve arrangement after a zero transition of the current to be disconnected, has decayed.

2. The circuit breaker as claimed in claim 1 further comprising:

at least one protective element connected in parallel with said semiconductor valve arrangement.

3. A circuit breaker comprising:

a commutation device, said commutation device containing at least one commutation switching point, a semiconductor valve arrangement connected in parallel with said commutation device, said semiconductor valve arrangement containing a series circuit of at least two series-connected semiconductor valves with the same direction of conduction, an isolating switching point connected in series with said semiconductor valve arrangement, wherein said at least one commutation switching point and said isolating switching point are actuated by mechanically driven switching members and controlled in such a manner that said isolating switching point opens after a stroke, performed in a predetermined time delay, of the switching members of said at least one commutation switching point, wherein said at least one commutation switching point and said one isolating switching point are formed by at least four switching members, a first of said switching members being connected to a first power terminal and to a first connection of said semiconductor valve arrangement, a second of said switching members being connected to a second connection of said semiconductor valve arrangement, a third of said switching members being connected to a second power terminal, and at least one fourth said switching member being connected to the at least one junction of at least two said series-connected semiconductor valves of said semiconductor valve arrangement, wherein said first switching member, said second switching member and said third switching member are located in the path of the current to be disconnected in the switched-on position, and wherein said at least one fourth switching member provides contact with said first switching member and said second switching member in the switched-on position, and wherein said second switching member and said third switching member are in contact with each other after the opening of said at least one commutation switching point, and a control circuit which detects the polarity of the current to be disconnected, detects a switching-off command for said circuit breaker, emits a response command acting on said commutation device when the detected current flows in the direction of conduction of said semiconductor valve arrangement, and emits a release command acting on said isolating switching point when the current to be disconnected is interrupted in said semiconductor valve arrangement after said commutation device has responded to said response command through the opening of said at least one commutation switching point, wherein said commutation device and said isolated switching point are controlled by mechanical coupling in such a manner that said isolated switching point opens at a time at which a depletion current, flowing through said semiconductor valve arrangement after a zero transition of the current to be disconnected, has decayed.

4. The circuit breaker as claimed in claim 3 further comprising:

at least one protective element connected in parallel with said semiconductor valve arrangement.

5. The circuit breaker as claimed in claim 3 further comprising:

compression springs being provided between each two of said switching members, wherein said switching members are of a dish-shaped construction and are arranged stacked together, wherein said third switching member displays a fixed contact part supporting said compression spring located between itself and said second switching member, said fixed contact part carrying a trailing contact, the trailing stroke of which is matched to the opening of said isolating switching point, which opening is delayed in time with respect to said at least one commutation switching point.

6. The circuit breaker as claimed in claim 5 further comprising:

at least one protective element connected in parallel with said semiconductor valve arrangement.

* * * * *